(No Model.) 2 Sheets—Sheet 1.
V. RÖPER.
CHAIN MACHINE.
No. 338,106. Patented Mar. 16, 1886.
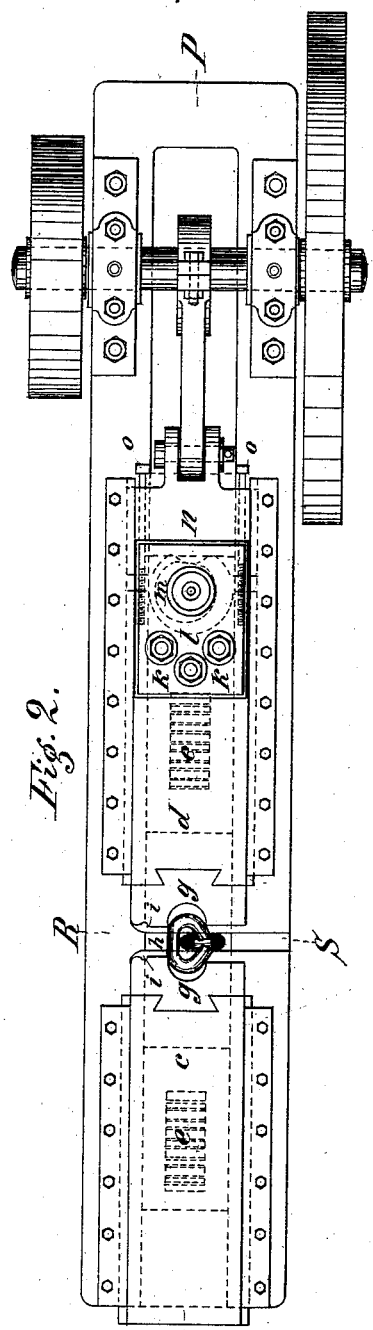
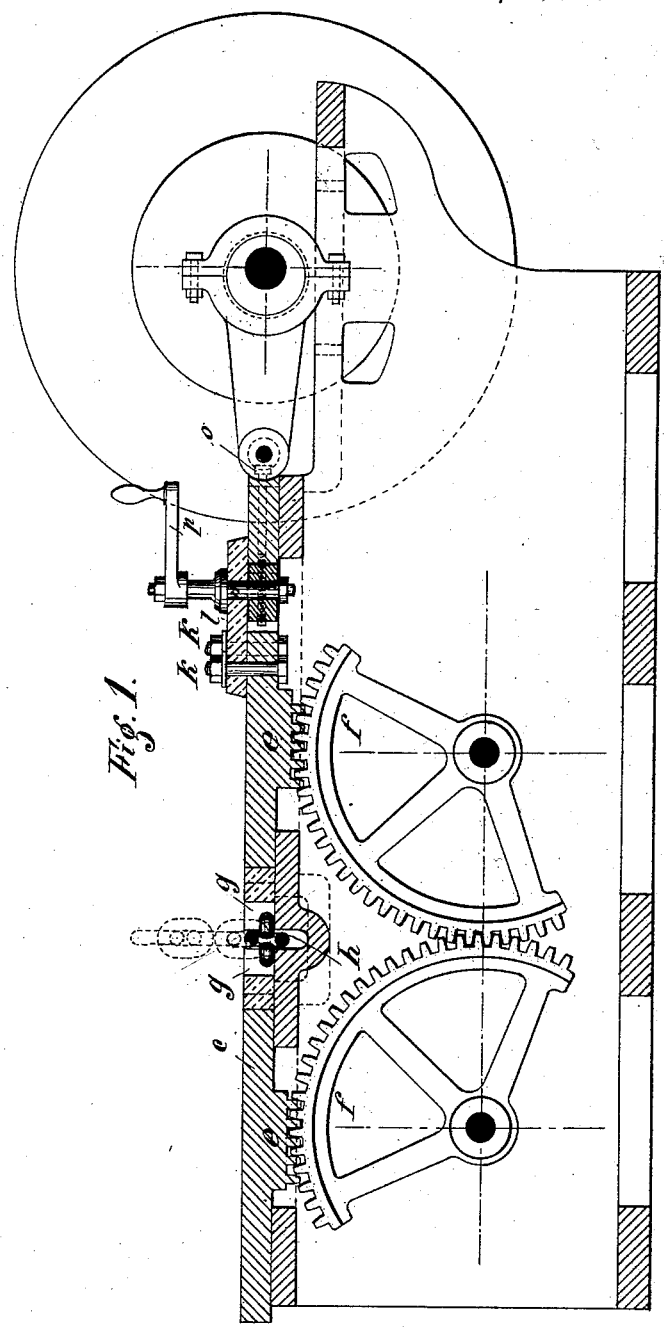
Witnesses
William Miller
A. Faber du Faur Jr.
Inventor
Victor Röper
by Van Santvoord & Hauff
his attys

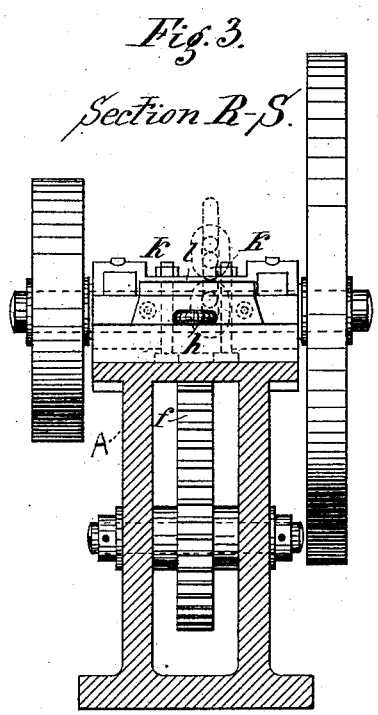

UNITED STATES PATENT OFFICE.

VICTOR RÖPER, OF DUISBURG-ON-THE-RHINE, PRUSSIA, GERMANY.

CHAIN-MACHINE.

SPECIFICATION forming part of Letters Patent No. 338,106, dated March 16, 1886.

Application filed February 19, 1885. Serial No. 156,431. (No model.)

*To all whom it may concern:*

Be it known that I, VICTOR RÖPER, a subject of the King of Prussia, residing at Duisburg-on-the-Rhine, in the Kingdom of Prussia, have invented new and useful Improvements in Machines for Manufacturing Heavy Chains for Ships, Cranes, and Similar Purposes, of which the following is a specification.

My invention relates to improvements in machines for manufacturing chains; and it consists, essentially, in the combination of two sliding carriages, means for actuating the carriages, and dies on said carriages, and also in the combination, with two sliding carriages, of a cam provided with a crank, and serving in connection with a reciprocating cross-head to regulate the pressure exerted upon the link, and to give an intermittent motion to the carriages. This combination of parts produces a machine adapted especially for manufacturing heavy chains for ships, cranes, and other purposes.

The construction of the parts is more fully pointed out in the following specification and claims, and illustrated in the accompanying drawings, in which—

Figure 1 represents a longitudinal section of the machine in the plane O P, Fig. 2. Fig. 2 is a top view thereof. Fig. 3 is a vertical transverse section in the plane R S, Fig. 2.

Similar letters indicate corresponding parts.

In the drawings, the letter A designates the frame of the machine, which supports a plate or table provided with two sets of guides, which are bolted to the table in the ordinary manner.

$c$ and $d$ are carriages, which fit between the guides, and can move longitudinally therein, and on the under side of the said carriages are racks $e$ $e$, which respectively gear into segments $f f$, secured to spindles having bearings in the frame A. The teeth of these gear-segments $f f$ mesh into each other, so that the reciprocating motion imparted to sliding carriage $d$, in a manner hereinafter to be described, is also transmitted to carriage $c$, but from the nature of the gearing the linear motion will be reversed, and the two carriages $c$ and $d$ will either move simultaneously toward each other, or vice versa.

At those extremities of the table which face each other are secured dies $g g$, and, as shown in the drawings, the dies are dovetailed to fit a dovetail in the carriage. One cheek of each of the dies serves to form the link, while smaller cheeks $i$ $i$, to one side of the first-named cheeks, are used to smooth the sheet. The carriage $d$ is secured by screws $k$ to a plate, $l$, from which is suspended a cam, $m$, which can be turned in a hole in the carriage, and lies directly in the center or pressure line of the carriage. This cam $m$ can be turned by means of a crank, $p$, extending therefrom, and having bearings in the plate $l$. Directly ahead of the sliding carriage, and between the guides on the table or plate, is a cross-head, $n$, which receives a continuous reciprocating motion from a shaft provided with a suitable pulley to receive a rotary motion. In the example shown in the drawings the cross-head $n$ receives its motion by an eccentric; but other usual means can be employed for this purpose. The sliding carriage $d$ is connected to the cross-head $n$ by two long bolts, $o$ $o$, which engage threads in the carriage $d$, but play loosely in the cross-head, and when the heads of the bolts extend out, as shown in the drawings, the cross-head can reciprocate without moving the carriage, or only slightly moving the same. By properly turning the eccentric $m$ the same is brought into contact with the rear end of the cross-head $n$, and the carriage $d$ is moved in the direction of the link; but as the cross-head proceeds in a direction toward the shaft the sliding carriage remains at rest until the cross-head engages with the head of the nuts, &c. By properly regulating the bolts the stroke of the carriage can be caused to be any fraction of that of the cross-head, and an intermittent reciprocating motion of the carriage is also thereby obtained. The motion of the carriage $d$ is also imparted to carriage $c$ by the means hereinbefore described.

The operation of the machine is as follows: After the piece of round iron $h$ has been formed as shown in the drawings, which may easily be done by a simple operation, the two extremities thereof are exposed in a forge until they assume a welding heat, and then the iron $h$ is quickly introduced between the two cheeks $g$ of the die, between which the link just finished is suspended. One limb of this link $h$ is also slipped between the finished link. The cam *m* is now turned in the proper direction to be engaged by cross-head *n*, and the two carriages *c* and *d* move toward each other. The iron to form the link having been placed horizontally between the cheeks of the dies *g g*, the ends thereof are pressed together, and the link assumes the proper shape; and, since the metal was at a welding heat, the ends of the link are firmly welded. A more intimate union of the joint is obtained by repeating the operation with a slightly-increased pressure, which may be done by moving the cam *m* in the proper direction to cause the carriages to approach nearer to each other at the next stroke of the cross-head. The link is now rapidly raised and brought into a vertical position between the two cheeks *i i* of the dies *g g*, with the shut or joint of the link in a proper position to be acted upon by said cheeks *i i*, and the cam *m* is so turned that the ends of the carriages *c* and *d* come very close together, whereby the protuberance following the shut-line is pressed down. The finished links are rolled upon a drum, (not shown in the drawings,) which is arranged above the machine, so as to facilitate the operation.

What I claim as new, and desire to secure by Letters Patent, is—

1. In a machine for manufacturing chains, the combination of two sliding carriages, *c d*, the segments *f f*, and the dies *g*, substantially as shown and described.

2. In a machine for manufacturing chains, the combination, with the two sliding carriages *c* and *d*, of the cam *m*, provided with a crank, *p*, and the reciprocating cross-head *n*, the said cam being adapted to be engaged by the cross-head to actuate the carriage *d*, substantially as shown and described.

3. In a machine for manufacturing chains, the combination, with the sliding carriages *c* and *d*, of the cam *m*, the reciprocating cross-head *n*, and the bolts *o*, extending through the cross-head and adjustable in the carriage *d*, substantially as shown and described.

In testimony whereof I have signed my name to this specification in the presence of two subscribing witnesses.

VICTOR RÖPER.

Witnesses:
GUST. SCHULTZ,
HEINR. JOS. HARZ.